A. WARTH.
Machines for Cutting Cloth.
No. 6,238. Reissued Jan. 19, 1875.
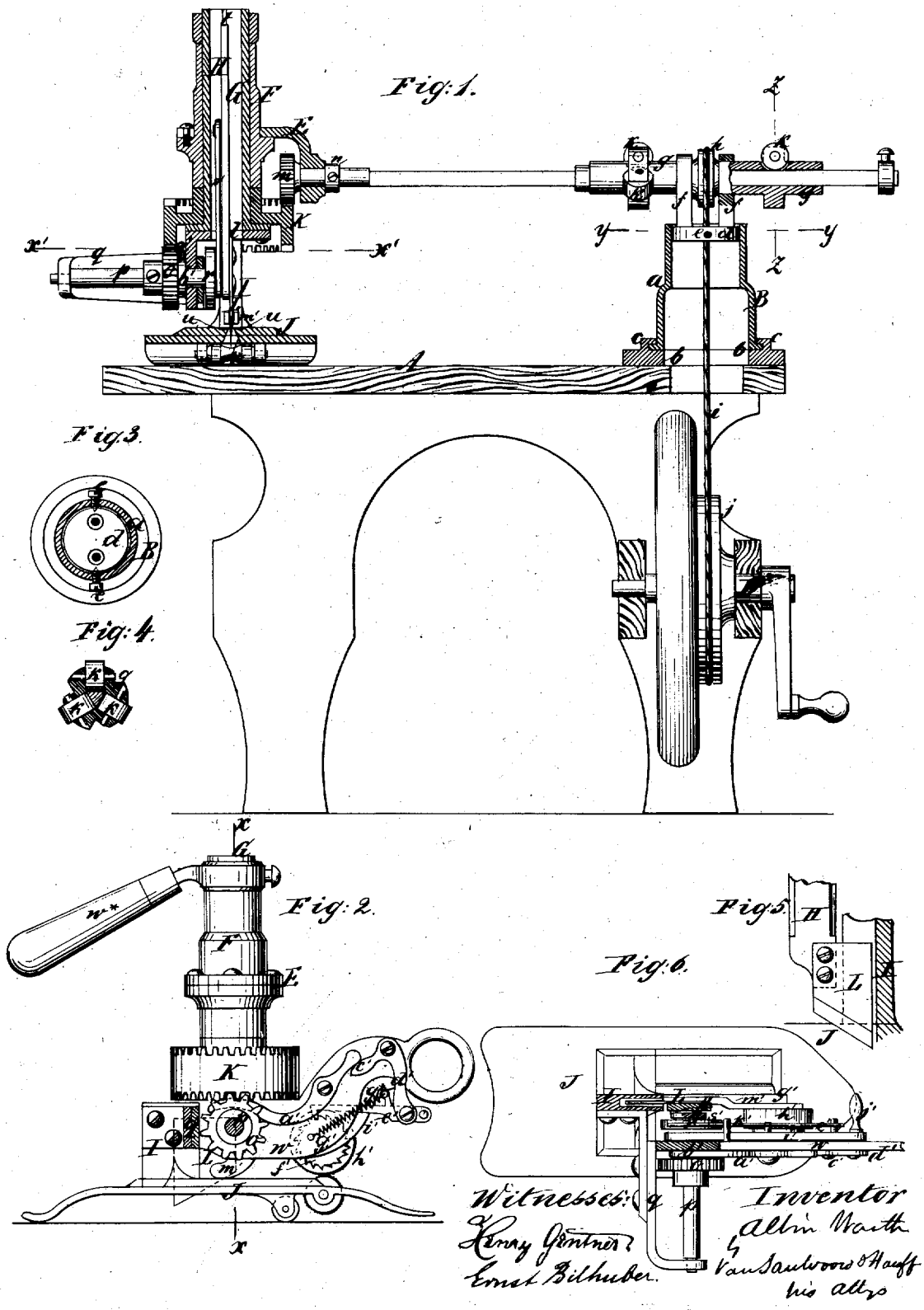
Witnesses:
Henry Gentner
Ernst Bilhuber
Inventor
Albin Warth
by Van Santwood & Hauff
his attys

UNITED STATES PATENT OFFICE.

ALBIN WARTH, OF STAPLETON, NEW YORK.

IMPROVEMENT IN MACHINES FOR CUTTING CLOTH.

Specification forming part of Letters Patent No. 130,343, dated August 6, 1872; reissue No. 6,238, dated January 19, 1875; application filed January 2, 1875.

*To all whom it may concern:*

Be it known that I, ALBIN WARTH, of Stapleton, in the county of Richmond and State of New York, have invented a certain new and Improved Machine for Cutting Textile and other Materials, of which the following is a specification:

This invention is illustrated in the accompanying drawing, in which—

Figure 1 represents a longitudinal vertical section of my invention, the plane of section of the cutting mechanism being indicated by the line *x x*, Fig. 2. Fig. 2 is a sectional side view of this invention. Fig. 3 is a horizontal section of the universal swivel-head in the line *y y*, Fig. 1. Fig. 4 is a transverse section of the sliding and revolving shaft in the line *z z*, Fig. 1. Fig. 5 is a detached section of the knife-carrying bar. Fig. 6 is a horizontal section of the cutting mechanism in the plane *x' x'*, Fig. 1.

Similar letters indicate corresponding parts.

This invention consists in the combination of a cutter-head containing a reciprocating knife with a foot-plate, which sustains the cutter-head, and which, during the operation of cutting, supports the material to be cut, the whole being capable of being moved in any desired direction; also, in combining with a knife-carrier a revolving and sliding shaft, said knife-carrier being allowed to turn round an axis at right angles to the direction of the sliding shaft in such a manner that by said shaft the required motion is imparted to the knife, and at the same time the knife-carrier, together with the knife, can be carried in any direction against the material to be cut; also, in the combination of a presser-roller with a cutter-head containing a reciprocating knife, and with a foot-plate arranged to move in any desired direction in such a manner that by the presser-roller the material to be cut is held down upon the foot-plate as the same is advanced or moved under the material to be cut; further, in combining with the knife-carrying bar a hollow tubular guide-rod or cylinder, to which is secured a handle in such a manner that by turning said hollow guide-rod the knife can be made to follow the sinuosities of the pattern to be cut; also, in the combination, with a cutter-head containing a reciprocating knife, of a foot-plate, provided with a socket, one or both edges of which form cutting-edges to co-operate with the edge of the knife, the whole being arranged to move in any desired direction; further, in the combination, with a cutter-head containing a reciprocating knife, and with a foot-plate supporting the cutter-head, and provided with a knife-receiving socket, of a bracket, which is grooved to form a guide for the knife, and prevents the knife from being twisted during the operation of cutting; also, in a hinged lever connected to the bracket of the foot-plate, and forming the bearing for a pin, which supports the presser-roller, in combination with a cam, which receives a rotary motion from the sliding revolving shaft, and from which motion is transmitted to the presser-roller in such a manner that the presser-roller is always in gear with the sliding revolving shaft in whatever position the foot-plate may be brought, and that by raising the hinged lever the presser-roller can be adjusted to the thickness of the material to be cut, or lifted clear above said material; further, in a finger or index hinged to the center-pin of the presser-roller, said pin being secured in a hinged lever, while the finger extends in front of the knife for the purpose of indicating the direction in which the knife is to cut; also, in a universal swivel-head, in combination with the sliding and revolving shaft, and with the foot-plate carrying the cutting mechanism in such a manner that the sliding and revolving shaft, together with the parts attached to it, can be swung or moved in any desired direction without throwing it out of gear with the driving-shaft, and by these means the knife is free to accommodate itself to the position or nature of the material to be cut; further, in the combination, with the cutter-head containing a reciprocating knife, and with a foot-plate, which supports the cutter-head, of one or more rollers, connected to the under surface of the foot-plate to allow said foot-plate to move easily in any desired direction.

In the drawing, the letter A designates a table, from which rises the swivel-head B, which supports the sliding and revolving shaft C. Said swivel-head consists of a tubular standard, *a*, which is provided with a bottom flange, *b*, to fit into a grooved bracket, *c*, which is firmly secured to the table A, the tubular standard *a* being free to rotate in said bracket. In the mouth of the tubular standard is fitted a plate, *d*, which swings between center-points *e*, (see Fig. 3,) and from which rise two standards, *f*, that form the bearings for a tubular shaft, *g*. By means of the center-points *e* this shaft can be swung up or down, or brought in any desired inclination toward the table A, while the tubular standard *a* allows the same to turn freely in either direction in a plane parallel to the surface of the table. On the tubular shaft *g* is mounted a pulley, *h*, which connects by a belt, *i*, with a pulley, *j*, mounted on the driving-shaft D, that has its bearings in boxes secured to one of the legs of the table A, and which receives motion by a hand-crank, or by a treadle, or by any suitable means. The pulleys *h* and *j* are geared, so that when the standard *a* is turned round the belt *i* will not be thrown off. The tubular shaft *g* is bored out to receive the sliding shaft C, which is by preference triangular, but which may be formed in any desirable manner, so that it will not turn in the tubular shaft, while it is free to slide therein. The sliding motion of the shaft C is facilitated by friction-rollers *k*, which project through the sides of the tubular shaft *g*, and bear from different sides against the sliding shaft C. (See Fig. 4.) One end of said sliding shaft is turned off round, and it has its bearing in a bracket, E, which extends from a sleeve, F, fitted on the cutter-head or hollow guide-rod G of the knife-carrying bar H. This hollow guide rod or cylinder is supported by a standard, I, which rises from the foot-plate J, said standard being provided with an annular bracket, *l*, (see Fig. 1,) that is screwed up against a flange on the bottom end of the hollow guide-rod, and on said flange rests a double cog-wheel, K, which is dropped loosely on the hollow guide-rod beneath the sleeve F, said sleeve being bored out to receive the tubular hub of the cog-wheel. The upper cogs of said cog-wheel gear into a pinion, *m*, mounted on the end of the sliding shaft C, inside of the bracket E, said shaft being prevented from sliding in the bracket by the pinion on one, and by a screw-ring, *n*, on the other, side of the bracket. The lower set of cogs of the cog-wheel K gear into a pinion, *o*, which is mounted on a shaft, *p*, that has its bearings in a bracket, *q*, extending from the standard I of the foot-plate. On this shaft is also secured a disk, *r*, carrying an eccentric wrist-pin, that connects by a rod, *s*, with the knife-carrying bar H, which moves up and down in grooves *t* in the hollow guide-rod G, and as the shaft C is revolved a reciprocating motion is imparted to the knife-carrying bar. L is the knife, which is by preference cut or stamped out of sheet metal, and which is secured to the bar H by screws or other suitable means, the front edge of the knife being so adjusted that it coincides with the center line of the hollow guide-rod, so that by turning this guide-rod, the front edge of the knife remains in the same plane. The lower cutting-edge of the knife is inclined, and it co-operates with a cutting-edge, *u*, formed on one or both sides of a knife-receiving socket or throat, *v*, in the foot-plate J. The standard I, which supports the guide-rod or cutter-head G, is grooved to receive the back edge of the knife L, (see Figs. 5 and 6,) so that by this guide-groove the cutting-edge of the knife is caused to enter the knife-receiving socket without fail, and that in turning the cutting mechanism during the operation of cutting the knife is prevented from being twisted. Furthermore, the cutting-edge of the knife is inclined upward, so that the same, even if its point should become slightly twisted, will gradually enter the knife-receiving socket, and the cutting-edge will not be injured. From the bracket *q*, which supports the shaft *p*, extends an arm, *w*, which terminates in a ring, and may serve as the handle for guiding the mechanism during the operation of cutting; or, if desired, an additional handle, *w**, may be secured to the upper end of the tubular guide-rod G. (See Fig. 2.) On one side of the arm *w* is secured a lever, *a'*, one end of which bears on the surface of a cam, *b'*, (see Figs. 1 and 6,) mounted on the shaft *p*, while its opposite end bears against the arm *c'* of a bell-crank lever, *c' d'*, the arm *d'* of which carries a pawl, *e'*, that engages with the teeth of a ratchet-wheel, *f'*. A spring, *g**, which acts on the pawl *e'*, serves to keep the lever *a'* in contact with the cam *b'*. The ratchet-wheel *f'* is mounted on a pin, *g'*, and it is firmly connected to the presser-roller *h'*, the pin *g'* being secured in a lever, *i'*, that swings on the shaft *p* on the side of the arm *w*, opposite to the lever *a'*. (See Fig. 6.) From this lever *i'* extends a thumb-piece, *j'*, so that the same can be raised, while a spring, *k'*, bears on said lever, and serves to depress the presser-roller *h'* toward a serrated roller, *l'*, which is mounted in the foot-plate. A stop-pawl, *m'*, prevents the ratchet-wheel *f'* and the presser-roller *h'* from turning in the wrong direction.

As the shaft *p* revolves, an intermittent rotary motion is imparted to the presser-roller *h'*, and if the material to be cut is held stationary, the cutting mechanism is fed automatically toward said material, the foot-plate J being placed beneath it, so that by the co-operation of the cutting-edges of the knife and of the throat the cutting is effected.

But if the cutting mechanism is moved toward the material to be cut, the presser-roller serves to hold the material down upon the foot-plate, so as to prevent it from rising up by the action of the knife.

The foot-plate is constructed with one or more rollers on its bottom surface, so that it will move more easy on the table A, and it may be curved, as shown in Fig. 2, or it may be made in the shape of a flat plate, either oblong or in any desirable form. During the operation of cutting, the foot-plate supports the material to be cut.

This machine is of particular value for cutting out such goods, where it is most convenient to move the cutting mechanism toward the material to be cut, and since the cutting mechanism can be readily moved or turned in any desired direction, I am enabled to cut out patterns of any desired form or shape. An index or finger, *m'*, which is hinged to the pin *g'*, enables the workman to guide the course of the knife with ease and facility. This index straddles the knife, and it bears down upon the material to be cut by its own inherent gravity, being free to adjust itself to the varying thickness of said material, while the pin *g'*, which forms the bearing for the presser-roller, and also for said index, rises and falls in accordance with the increased or diminished thickness of the material to be cut.

What I claim as new, and desire to secure by Letters Patent, is—

1. The combination of a cutter-head, containing a reciprocating knife with a foot-plate, which sustains the cutter-head, and which, during the operation of cutting, supports the material to be cut, the whole being arranged to be moved in any desired direction, substantially in the manner herein set forth.

2. The combination of a revolving and sliding shaft, with a knife-carrier, which is free to turn round an axis at right angles to the revolving and sliding shaft, said shaft serving to impart the requisite motion to the knife, substantially in the manner described.

3. The combination, with a cutter-head containing a reciprocating knife, and with a foot-plate which sustains the cutter-head, of a presser-roller, the whole being arranged to move in any desired direction, the presser-roller serving to hold the material down upon the foot-plate, while the same is moved under the material to be cut, substantially as set forth.

4. The combination of a hollow guide-rod, G, with a knife-carrying bar, H, said hollow guide-rod being provided with a handle for moving the cutting mechanism in any desired direction, substantially in the manner described.

5. The combination, with a cutter-head, containing a reciprocating knife, of a foot-plate, arranged to support the cutter-head, and provided with a socket, one or both edges of which form cutting-edges to co-operate with the cutting-edge of the knife, the whole being arranged to move in any desired direction, substantially as set forth.

6. The combination, with a cutter-head containing a reciprocating knife, and with a foot-plate supporting the cutter-head, and provided with a socket, one or both edges of which form cutting-edges to co-operate with the cutting-edge of the knife, of a standard which supports the cutter-head, and which is grooved to form a guide for the knife, the whole being arranged to move in any desired direction, substantially as described.

7. The lever *i'*, which is hinged to the standard I, or to any part rigidly connected to said standard, and forms the bearing for a pin supporting the presser-roller *h'*, in combination with a cam which receives motion from a sliding and revolving shaft, and from which motion is transmitted to the presser-roller, substantially as and for the purpose described.

8. The finger or presser *m'*, hinged to the center pin of the presser-roller, arranged to travel in front of the knife, said finger being free to adjust itself to the varying thickness of the material to be cut, substantially as set forth.

9. The combination of a revolving cylinder, B, swivel-head *d*, and a pulley with a sliding and revolving shaft, C, substantially as described.

10. The combination, with a cutter-head containing a reciprocating knife, and with a foot-plate which supports the cutter-head, of one or more rollers connected to the under surface of the foot-plate, and allowing the same to move freely, substantially as described.

In testimony that I claim the foregoing I have hereunto set my hand and seal this 24th day of December, 1874.

ALBIN WARTH. [L. S.]

Witnesses:

W. HAUFF,

E. F. KASTENHUBER.